United States Patent
Lapp et al.

(10) Patent No.: US 8,613,137 B2
(45) Date of Patent: Dec. 24, 2013

(54) CONNECTING ROD LUBRICATION RECESS

(71) Applicant: Mahle International GmbH, Stuttgart (DE)

(72) Inventors: Michael T. Lapp, Bloomfield, MI (US); Dan Dinu, Windsor (CA); Roger A. Krause, Howell, MI (US); Alan Stephen McEwan, South Lyon, MI (US)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 13/709,808

(22) Filed: Dec. 10, 2012

(65) Prior Publication Data

US 2013/0092119 A1     Apr. 18, 2013

Related U.S. Application Data

(60) Continuation-in-part of application No. 12/476,337, filed on Jun. 2, 2009, now abandoned, and a continuation-in-part of application No. 13/296,397, filed on Nov. 15, 2011, which is a division of application No. 12/356,110, filed on Jan. 20, 2009, now Pat. No. 8,079,145, which is a division of application No. 10/989,633, filed on Nov. 16, 2004, now Pat. No. 7,581,315.

(51) Int. Cl.
   *B21D 53/84* (2006.01)
(52) U.S. Cl.
   USPC .............. 29/888.092; 29/888.042; 29/888.09
(58) Field of Classification Search
   USPC ......... 29/888.042, 888.044, 888.051, 888.09, 29/888.091, 888.092
   See application file for complete search history.

(56) References Cited

U.S. PATENT DOCUMENTS

| | | |
|---|---|---|
| 448,766 A | 3/1891 | Kelliher |
| 491,974 A | 2/1893 | Barler |
| 1,491,155 A | 4/1924 | McKone |
| 1,921,044 A | 8/1933 | Sparrow |
| 1,947,023 A | 2/1934 | Shoemaker |
| 1,959,279 A | 5/1934 | Stearns |
| 2,202,773 A | 5/1940 | Given |

(Continued)

FOREIGN PATENT DOCUMENTS

| | | |
|---|---|---|
| DE | 1208118 B | 12/1965 |
| DE | 3144720 A1 | 5/1983 |

(Continued)

OTHER PUBLICATIONS

International Search Report for PCT/EP2010/003262.

(Continued)

*Primary Examiner* — David Bryant
*Assistant Examiner* — Ryan J Walters
(74) *Attorney, Agent, or Firm* — Rader, Fishman & Grauer PLLC

(57) ABSTRACT

Exemplary connecting rods and methods of making a connecting rod are disclosed. A method of making a connecting rod may include the step of providing a connecting rod blank, where the connecting rod blank includes a crankshaft end and a piston pin end. The method may further include forming a crankshaft pin recess in the crankshaft end of the connecting rod blank and a piston pin recess in the piston pin end, and forming at least one lubrication recess in the piston pin end of the connecting rod blank. The lubrication recess and the piston pin recess may both formed concurrently.

15 Claims, 11 Drawing Sheets

(56) References Cited

U.S. PATENT DOCUMENTS

| | | | |
|---|---|---|---|
| 2,544,913 A | 3/1951 | Brantingham | |
| 2,673,767 A | 3/1954 | Schoeppner | |
| 3,161,185 A | 12/1964 | Justinien et al. | |
| 3,479,929 A | 11/1969 | Fangman | |
| 3,830,341 A | 8/1974 | Davies et al. | |
| 3,935,797 A | 2/1976 | Niimi et al. | |
| 3,971,355 A | 7/1976 | Kottmann | |
| 3,994,054 A | 11/1976 | Cuddon-Fletcher et al. | |
| 4,233,088 A | 11/1980 | Kronstein | |
| 4,388,523 A | 6/1983 | Keep, Jr. et al. | |
| 4,430,906 A | 2/1984 | Holtzberg et al. | |
| 4,709,620 A | 12/1987 | Mielke | |
| 4,863,513 A | 9/1989 | Umeha et al. | |
| 4,974,498 A | 12/1990 | Lemelson | |
| 4,984,544 A | 1/1991 | DeBiasse | |
| 5,039,285 A | 8/1991 | Lindstrom | |
| 5,081,967 A | 1/1992 | Kemnitz et al. | |
| 5,158,695 A | 10/1992 | Yashchenko et al. | |
| 5,243,878 A | 9/1993 | Santi | |
| 5,257,603 A | 11/1993 | Bauer et al. | |
| 5,352,541 A | 10/1994 | Tanaka et al. | |
| 5,544,413 A | 8/1996 | Stevens et al. | |
| 5,549,034 A | 8/1996 | Loughlin | |
| 5,592,927 A | 1/1997 | Zaluzec et al. | |
| 5,613,182 A | 3/1997 | Lynn | |
| 5,661,904 A | 9/1997 | Loughlin | |
| 5,772,801 A | 6/1998 | Baldi et al. | |
| 5,836,280 A | 11/1998 | Miyazawa | |
| 5,878,323 A | 3/1999 | Sakai et al. | |
| 5,878,491 A * | 3/1999 | Morgen et al. | 29/888.09 |
| 6,134,779 A | 10/2000 | Walker et al. | |
| 6,250,275 B1 | 6/2001 | Bock et al. | |
| RE37,565 E | 3/2002 | Bubeck | |
| 6,357,918 B1 | 3/2002 | Kagohara et al. | |
| 6,422,755 B1 | 7/2002 | Cadle et al. | |
| 6,427,326 B1 | 8/2002 | Soga et al. | |
| 6,446,436 B1 | 9/2002 | Winkelmann et al. | |
| 6,481,389 B2 | 11/2002 | Suzuki et al. | |
| 6,491,013 B1 | 12/2002 | Gaiser et al. | |
| 6,497,771 B1 | 12/2002 | Schubach et al. | |
| 6,513,477 B1 | 2/2003 | Gaiser et al. | |
| 6,539,910 B1 | 4/2003 | Gaiser et al. | |
| 6,540,403 B1 | 4/2003 | Damour | |
| 6,557,457 B1 | 5/2003 | Hart et al. | |
| 6,565,258 B1 | 5/2003 | Yamada et al. | |
| 6,579,492 B2 | 6/2003 | Wehler | |
| 6,640,779 B1 | 11/2003 | Thiyagarajan | |
| 6,742,253 B2 | 6/2004 | Geiman et al. | |
| 6,769,518 B2 | 8/2004 | Uehara et al. | |
| 7,107,893 B2 | 9/2006 | Weinkauf et al. | |
| 7,118,279 B2 | 10/2006 | Fujita et al. | |
| 7,178,238 B2 * | 2/2007 | Rumpf et al. | 29/888.09 |
| 7,305,960 B2 | 12/2007 | Zvonkovic | |
| 7,516,546 B2 | 4/2009 | McEwan | |
| 7,581,315 B2 | 9/2009 | McEwan | |
| 7,810,411 B2 | 10/2010 | McEwan | |
| 8,079,145 B2 | 12/2011 | McEwan | |
| 8,245,687 B2 | 8/2012 | Lapp et al. | |
| 8,484,844 B2 | 7/2013 | McEwan | |
| 2002/0157534 A1 | 10/2002 | Schneider et al. | |
| 2003/0128903 A1 | 7/2003 | Yasuda et al. | |
| 2004/0228554 A1 | 11/2004 | Fujita et al. | |
| 2005/0155451 A1 | 7/2005 | Abeln et al. | |
| 2005/0160597 A1 | 7/2005 | Hase | |
| 2007/0204746 A1 | 9/2007 | Issler et al. | |
| 2008/0115621 A1 * | 5/2008 | McEwan | 74/579 R |
| 2009/0314244 A1 | 12/2009 | Yang et al. | |
| 2010/0300397 A1 | 12/2010 | Lapp et al. | |

FOREIGN PATENT DOCUMENTS

| | | |
|---|---|---|
| DE | 3733982 A1 | 4/1989 |
| DE | 3838288 A1 | 11/1989 |
| DE | 4034808 A1 | 5/1991 |
| DE | 4210056 A1 | 9/1993 |
| DE | 19700339 A1 | 7/1997 |
| DE | 19911339 A1 | 9/2000 |
| DE | 19924679 A1 | 12/2000 |
| DE | 10029950 A1 | 1/2002 |
| DE | 10233263 A1 | 2/2004 |
| DE | 10247130 A1 | 4/2004 |
| DE | 10305461 A1 | 8/2004 |
| DE | 102004024576 A1 | 12/2005 |
| DE | 102005043217 A1 | 3/2007 |
| DE | 102006013399 A1 | 7/2007 |
| EP | 0095052 A2 | 11/1983 |
| EP | 1167737 A2 | 1/2002 |
| FR | 1300937 A | 8/1962 |
| FR | 2872872 A1 | 1/2006 |
| GB | 2319582 A | 5/1998 |
| GB | 2330788 A | 5/1999 |
| JP | 06173937 A | 6/1994 |
| JP | 09049489 A | 2/1997 |
| JP | 10131729 A | 5/1998 |
| KR | 1055150 | 4/2001 |
| KR | 3050301 | 6/2003 |
| KR | 3090296 | 11/2003 |
| RU | 2204735 C1 | 5/2003 |
| WO | WO-92/07200 A1 | 4/1992 |
| WO | WO-2007073720 A1 | 7/2007 |

OTHER PUBLICATIONS

Feb. 24, 2011 Office Action for U.S. Appl. No. 12/356,110.
Jan. 11, 2011 Office Action for U.S. Appl. No. 12/356,110.
Dec. 31, 2007 Office Action for U.S. Appl. No. 10/989,633.
Mar. 26, 2008 Office Action for U.S. Appl. No. 10/989,633.
Jul. 1, 2008 Office Action for U.S. Appl. No. 10/989,633.
Dec. 9, 2008 Final Office Action for U.S. Appl. No. 10/989,633.
Jan. 3, 2013 Office Action for U.S. Appl. No. 13/296,397.
Mar. 2, 2010 Office Action for U.S. Appl. No. 12/023,250.
Oct. 20, 2009 Final Office Action for U.S. Appl. No. 12/023,250.
Mar. 12, 2009 Office Action for U.S. Appl. No. 12/023,250.
Jul. 10, 2012 Office Action for U.S. Appl. No. 12/476,337.
Feb. 19, 2008 Office Action for U.S. Appl. No. 10/990,135.

* cited by examiner

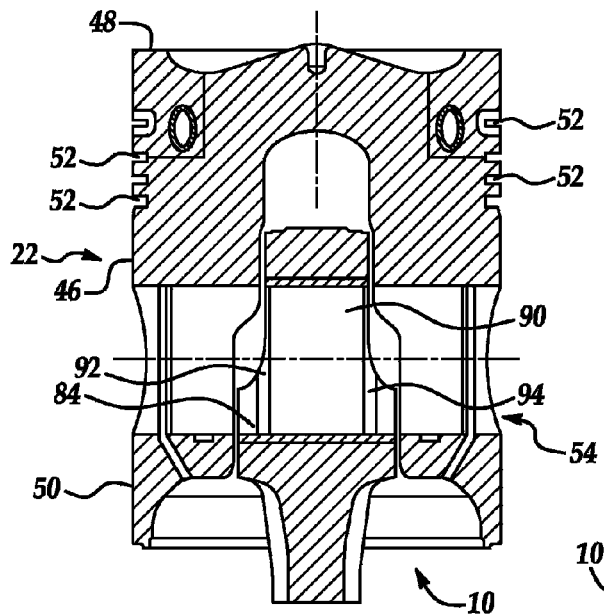
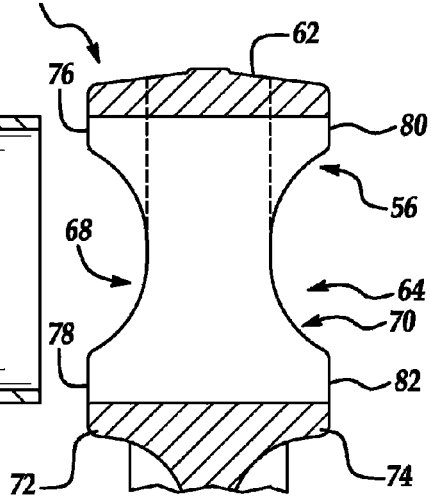
FIG. 2
FIG. 3A
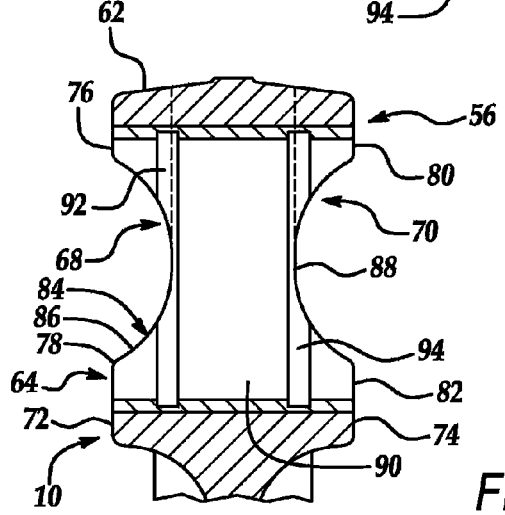
FIG. 3B

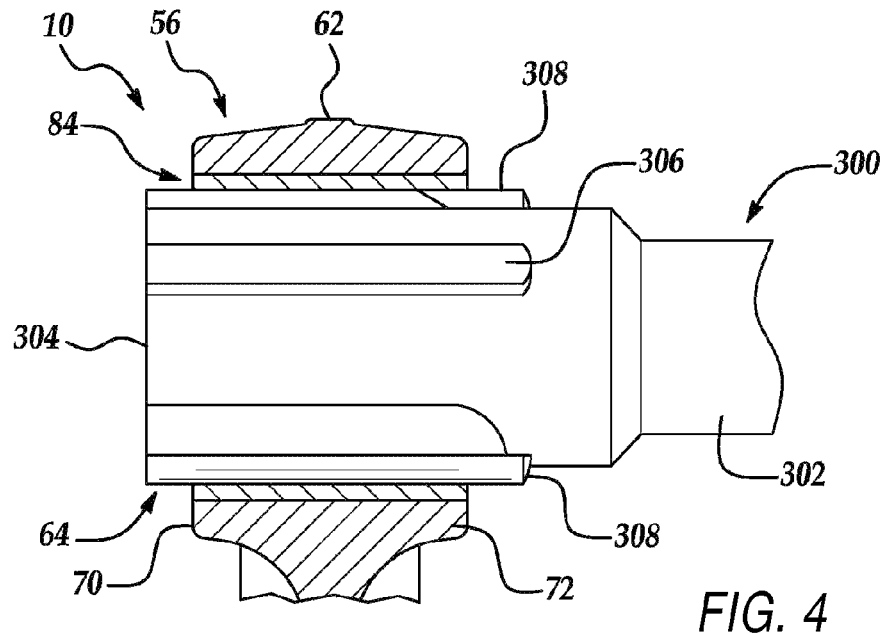
FIG. 4
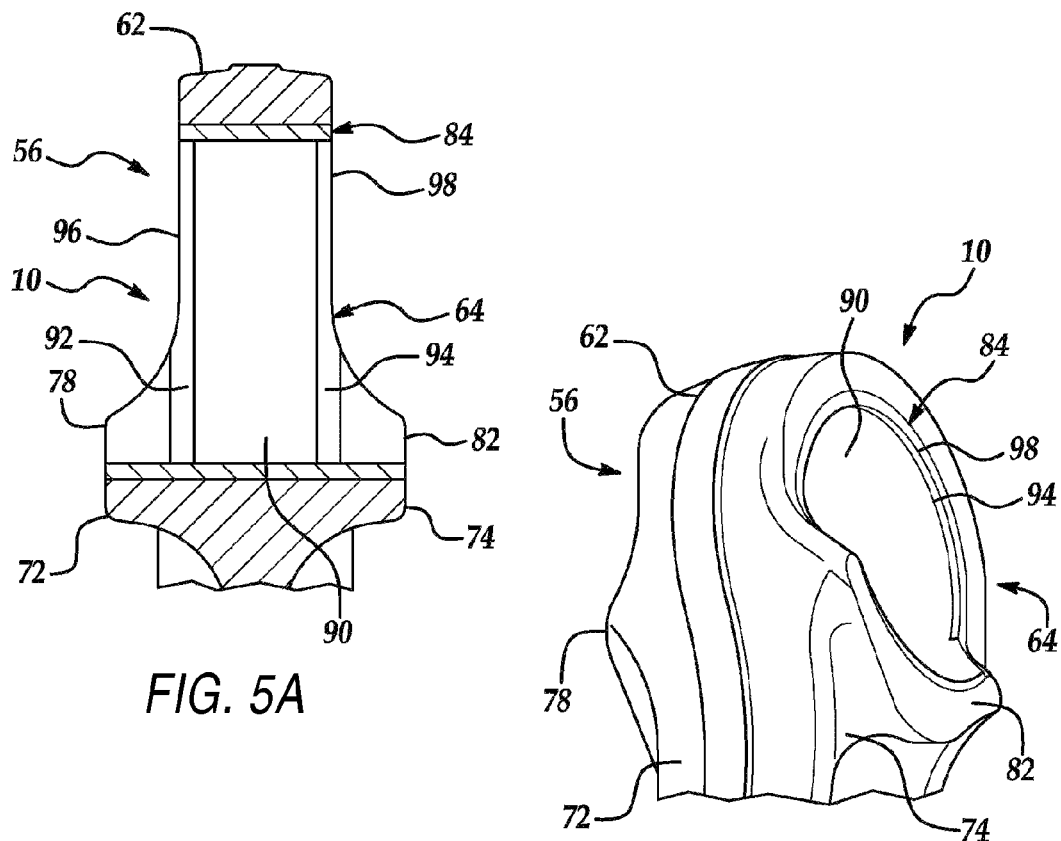
FIG. 5A
FIG. 5B

CONNECTING ROD LUBRICATION RECESS

CROSS-REFERENCE TO RELATED APPLICATIONS

This application is a Continuation-in-Part of U.S. patent application Ser. No. 13/296,397 filed on Nov. 15, 2011, entitled METHOD OF MANUFACTURING A CONNECTING ROD ASSEMBLY FOR AN INTERNAL COMBUSTION ENGINE, which is a divisional of U.S. patent application Ser. No. 12/356,110 filed on Jan. 20, 2009, entitled METHOD OF MANUFACTURING A CONNECTING ROD ASSEMBLY FOR AN INTERNAL COMBUSTION ENGINE and now issued as U.S. Pat. No. 8,079,145, which is a divisional of U.S. patent application Ser. No. 10/989,633 filed on Nov. 16, 2004, entitled CONNECTING ROD ASSEMBLY FOR AN INTERNAL COMBUSTION ENGINE AND METHOD OF MANUFACTURING SAME and now issued as U.S. Pat. No. 7,581,315, and the contents of each are hereby expressly incorporated by reference in their entireties. This application is also a Continuation-in-Part of U.S. patent application Ser. No. 12/476,337 filed on Jun. 2, 2009, entitled CONNECTING ROD LUBRICATION RECESS, the contents of which are hereby expressly incorporated by reference in its entirety.

FIELD

The present disclosure relates, generally, to connecting rod assemblies and, more specifically, to a connecting rod assembly for an internal combustion engine and method of manufacturing the same.

BACKGROUND

The traditional internal combustion engine relies on connecting rods for transmitting combustion power from a piston main body to a crankshaft of the engine, thereby converting the linear motion of the piston main body to rotational motion at the crankshaft. Combustion power is generated from the intermittent ignition of gasoline that is injected into the combustion chamber, which creates extreme pressures that are applied to the piston and connecting rod. In particular, the interface between the piston pin bore of the connecting rod and the piston pin experiences continuous radial loads during operation, where only a limited amount of a lubricant may be available for lubricating the interface. In an effort to enhance lubrication at the interface of the piston pin and the connecting rod bore, at least one lubrication recess may be provided along an inner surface of the piston pin bore.

Typically, the lubrication recess is created by machining an indentation into an inner surface of the piston pin bore of the connecting rod. The machining process may be a separate manufacturing operation that occurs after the connecting rod piston pin bore has been created through a material forming operation, such as, for example, forging. Machining operations may add to the expense and the complexity of manufacturing the connecting rod.

Accordingly, there is a need in the art for a connecting rod including a lubrication recess that is relatively cost-effective and simple to manufacture. Moreover, there is an ongoing need to streamline manufacturing processes associated with connecting rods while retaining strength and acceptable product life of connecting rod assemblies.

BRIEF DESCRIPTION OF THE DRAWINGS

While the claims are not limited to the illustrated approaches, an appreciation of various aspects is best gained through a discussion of various examples thereof. Referring now to the drawings, illustrative examples are shown in detail. Although the drawings represent the exemplary illustrations, the drawings are not necessarily to scale and certain features may be exaggerated to better illustrate and explain an innovative aspect of an exemplary illustration. Further, the examples described herein are not intended to be exhaustive or otherwise limiting or restricting to the precise form and configuration shown in the drawings and disclosed in the following detailed description. Exemplary illustrations are described in detail by referring to the drawings as follows.

FIG. 2 is an enlarged cross-sectional view of an exemplary connecting rod assembly manufactured pursuant to one exemplary illustration and shown secured to a piston;

FIG. 3A is an exploded, fragmentary cross-sectional view of the small end of an exemplary connecting rod assembly with formed channels but prior to installation of a bushing and final machining, with the final machining lines shown in phantom, in accordance with an exemplary illustration;

FIG. 3B is a fragmentary cross-sectional view of the small end of an exemplary connecting rod assembly after the bushing has been inserted but prior to final machining with the final machining lines shown in phantom, in accordance with one exemplary illustration;

FIG. 4 is a fragmentary cross-sectional view of the small end of the connecting rod assembly and illustrating a machining tool to define a contact surface in the small end that engages a piston pin manufactured pursuant to one exemplary illustration;

FIG. 5A is a fragmentary cross-sectional view of the small end of the connecting rod assembly manufactured pursuant to one exemplary approach;

FIG. 5B is a fragmentary perspective view of the exemplary small end of the connecting rod assembly of FIG. 5A;

DETAILED DESCRIPTION

Figure 1:
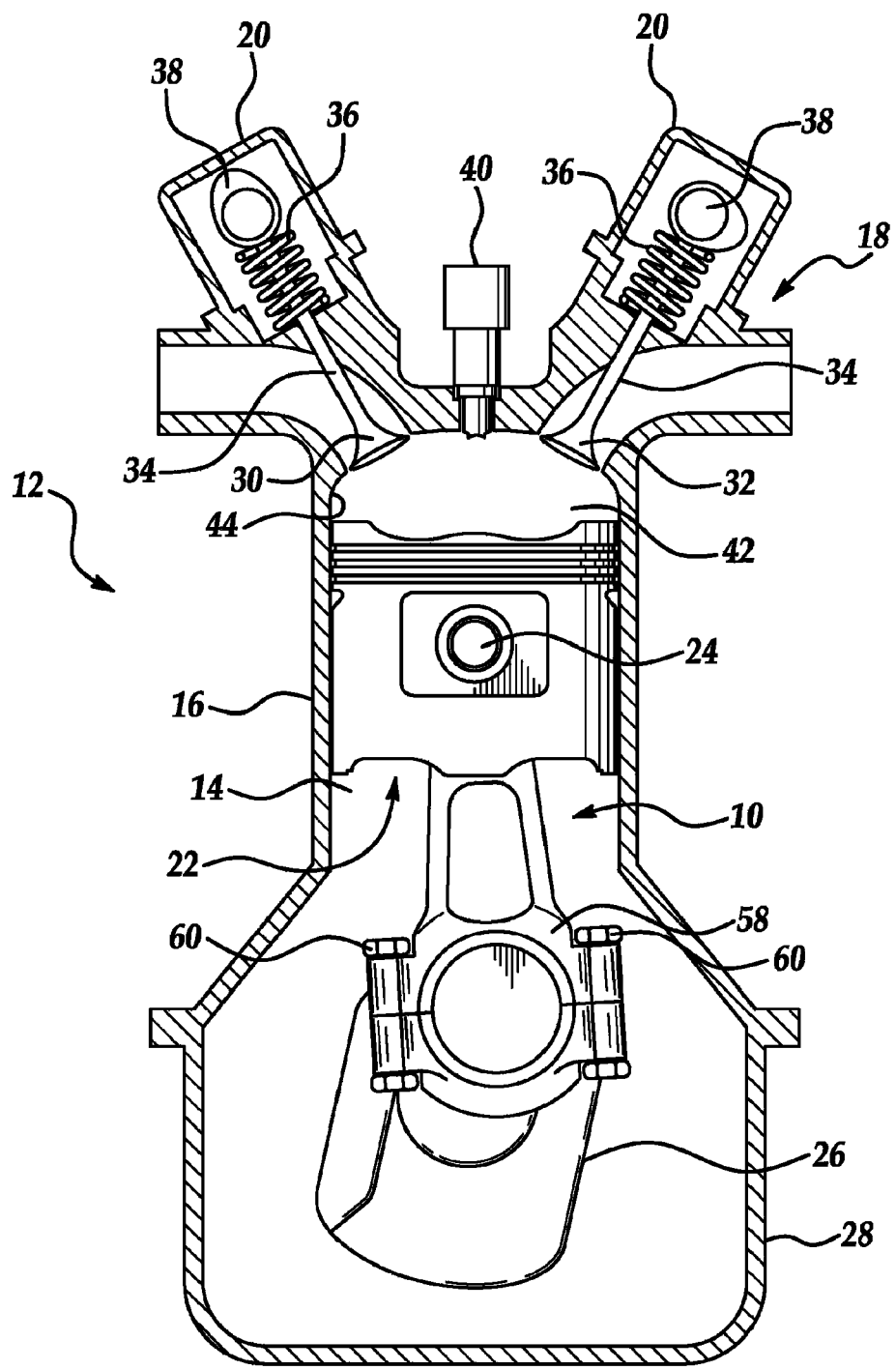
FIG. 1 is a cross-sectional environmental view of an internal combustion engine including an exemplary connecting rod assembly manufactured pursuant to one exemplary approach.

Reference in the specification to "an exemplary illustration", an "example" or similar language means that a particular feature, structure, or characteristic described in connection with the exemplary approach is included in at least one illustration. The appearances of the phrase "in an illustration" or similar type language in various places in the specification are not necessarily all referring to the same illustration or example.

Exemplary illustrations are described herein that are generally directed to various connecting rod assemblies and methods of manufacturing a connecting rod assembly, including a reduced width small end for use in internal combustion engines, connecting rods that employ bushings, and bushingless connecting rods. To this end, some exemplary illustrations include a connecting rod assembly adapted to interconnect a piston and a crankshaft so as to translate the reciprocal movement of the piston into rotational movement of the crankshaft. An exemplary connecting rod assembly may generally include a first end secured to a crankshaft and a second end having a bore extending therethrough and adapted to be aligned with a piston pin bore and receive a piston pin. The second end further may include a terminal end and may, in some exemplary illustrations, have a reduced width configuration. The reduced width configuration may be formed by machining a pair of channels that are formed on opposite sides of the second end between each channel and the terminal end. Some exemplary connecting rod assemblies further may include a bushing disposed within the bore including a contact surface having opposed distal ends. The bushing may provide a smooth angular movement between the connecting rod and a piston pin. The bushing may further include at least partially annular grooves disposed on the contact surface along at least a portion of the opposed distal ends, where the grooves substantially eliminate the need for the small end to undergo a deburring process after the second end is machined to provide a reduced width configuration.

The exemplary illustrations may further include methods of manufacturing a connecting rod assembly. One exemplary method may include defining a small end of a connecting rod having a terminal end and defining a pin bore extending through the small end of the connecting rod. Once the small end of the connecting rod is defined, a pair of channels may be formed on opposite sides of the small end of the connecting rod where the axis of each of the channels is substantially perpendicular to the axis of the pin bore. A bushing having a contact surface including at least partially annular grooves disposed thereon may also be formed and subsequently installed into the pin bore of the small end. Once the bushing is installed into the pin bore, the connecting rod may be machined to reduce the width of the small end between each channel and the terminal end such that the grooves are disposed along at least a portion of the distal ends of the contact surface.

Accordingly, one advantage may be provided by streamlining manufacturing, e.g., by essentially eliminating the need for a deburring process after the small end of the connecting rod is machined to a reduced width configuration.

Still another advantage may be provided in that moment forces generated when installing a bushing into a pin bore of a stepped small end of a connecting rod are reduced, thereby reducing the likelihood of deforming the bushing and creating an irregular contact area between the bushing as well as the pin bore and the bushing and the piston pin.

Still another advantage may be provided, in that a moment force generated when defining a contact surface within the pin bore of a stepped small end of a connecting rod assembly that receives a piston pin is reduced, thereby reducing the likelihood of deforming the distal ends of the contact surface and creating an irregular pivot point between the contact surface and the piston pin.

Still another advantage may be provided, where the manufacture of a connecting rod assembly is generally streamlined, e.g., by reducing the need for inspecting and correcting irregularities caused by moment forces generated during installation of a bushing.

Still another advantage may be provided, in that the manufacture of a connecting rod assembly and connecting rod assembly is generally streamlined, e.g., by reducing the need for inspecting and correcting irregularities caused by moment forces generated during machining to define a contact surface within the small end that engages a piston pin.

A connecting rod assembly manufactured pursuant to one exemplary illustration is generally indicated at 10 throughout the figures, where like numbers are used to designate like structures throughout FIGS. 1-7 of the drawings. As shown in FIG. 1, the connecting rod assembly 10 may generally be adapted for use in an internal combustion engine, generally indicated at 12. In this case, the exemplary assembly 10 is illustrated in connection with a single cylinder 14 of an internal combustion engine 12 having a dual-overhead cam arrangement. The engine 12 may be but one of the many internal combustion engines with which the exemplary illustrations may be employed. By way of example, the exemplary connecting rods and methods of manufacturing the same may be employed in connection with connecting rod assemblies used in a two-stroke or four-stroke engine. The cylinders may be arranged in an in-line, v-shaped, or flat manner or in any other manner that is convenient. Exemplary connecting rod assemblies may also be employed with a carbureted or fuel injected internal combustion engine having single or dual overhead or undermounted cam(s).

With continuing reference to FIG. 1, the internal combustion engine 12 includes an engine block 16 having one or more cylinders 14, and a cylinder head generally indicated at 18 associated with the engine block 16. Rocker panels 20 are associated with the cylinder head 18 in any manner that is convenient. A piston, generally indicated at 22, is supported for reciprocal movement in a cylinder 14. The connecting rod assembly 10 may be secured to the piston 22 through a piston pin 24 as will be explained in greater detail below. A crankshaft 26 is associated with the connecting rod assembly 10 and an oil pan 28 is associated with the engine block 16. An intake valve 30 and an exhaust valve 32, each having valve stems 34 and valve springs 36 are supported in the cylinder head 18 and are opened and closed via cams 38 to provide fluid communication between the cylinder 14 and the intake valve 30 and the exhaust valve 32. The internal combustion engine 12 also includes a spark plug 40 for igniting the fuel within the combustion chamber 42 defined by the cylinder walls 44 and above the piston 22. Alternatively, or in addition, the engine 12 may include a fuel injector (not shown) as a means of introducing atomized fuel into the combustion chamber 42. Thus, exemplary connecting rods may be employed in connection with both a spark ignition or compression ignition (diesel) engine.

Generally, fuel is combusted within the combustion chamber 42 of a cylinder 14 to reciprocate the piston 22. The piston 22 drives the connecting rod assembly 10, which drives the crankshaft 26, causing it to rotate within the engine block 16. Specifically, the combustion pressure within the cylinder 14 drives the piston 22 downward in a substantially linear, but slightly rotational motion. On the other hand, movement of the crankshaft 26 drives the connecting rod assembly 10 in a substantially rotational motion.

As shown in FIG. 2, the piston 22 includes a body 46 having a crown 48 formed at the uppermost margins of the body 46 and a skirt 50 depending from the crown 48. Ring lands 52 extend about the outer circumference of the body 46 between the crown 48 and the skirt 50. The ring lands 52 are adapted to retain piston rings (not shown). The body 46 further includes a bore 54 formed therein. The bore 54 is adapted to receive the piston pin 24. The piston pin 24 is often cylindrical in shape and includes a substantially uniform diameter. This shape has been adopted as the standard for most applications. However, the piston pin 24 may include a center area having a reduced diameter with respect to the diameter of the distal ends. Accordingly, the bore 54 may include a shape that corresponds to the shape of the piston pin 24. Furthermore, pistons can have many different shapes, sizes, and other structural features. By way of example, the pistons 22 may include any number of ring lands 52, or protrusions and/or recesses on the crown 48 for facilitating the combustion process and enhancing the power or efficiency derived therefrom. The piston 22 may also include recesses or grooves formed on the piston skirt 50 or a coating applied to the piston skirt 50.

As mentioned above, the connecting rod assembly 10 may generally be adapted to interconnect the piston 22 and the crankshaft 26 so as to translate the reciprocal movement of the piston 22 into rotational movement of the crankshaft 26. To this end, the connecting rod assembly 10 includes a small end, generally indicated at 56, secured to the piston 22 via the piston pin 24 and a large or crank end 58 operatively secured to the crankshaft 26 through bolts 60. The small end 56 includes a terminal end 62 and a pin bore, generally indicated at 64, extending therethrough. The pin bore 64 is adapted to receive the piston pin 24. As described above, the piston pin 24 may include a number of different shapes which depart from the standard cylindrical shape used in most applications. Accordingly, the pin bore 64 of the connecting rod assembly 10 may generally accommodate an overall shape of piston pin 24 employed for a particular application.

Referring to FIGS. 3A and 3B, an exemplary connecting rod assembly 10, manufactured according to one exemplary approach, may include a pair of channels, generally indicated at 68 and 70, formed on opposite sides 72, 74 of the small end 56. The sides 72, 74 on which the channels 68, 70 are located are the sides through which the pin bore 64 extends, such that the axis of each of the channels 68, 70 is substantially parallel to each other and perpendicular to the axis of the pin bore 64. Each of the channels 68, 70 includes a pair of ridges 76, 78, 80, 82 on opposite sides of the pin bore 64. The ridges 76, 78 and 80, 82 for each channel 68, 70 respectively, are coplanar to reduce or eliminate any moment force that may be generated when a bushing, to be described in greater detail below, is installed into the pin bore 64, thereby reducing misalignment between the bushing and pin bore and deformation of the bushing. Additionally, the ridges 76, 78, 80, 82 reduce or eliminate any moment force that may be generated when the contact surface within the small end 56 is defined by machining or otherwise, as will be described in greater detail below.

The connecting rod assembly 10 may, in some exemplary approaches, include a bushing, generally indicated at 84. The bushing 84 includes a predetermined outer diameter to facilitate installation of the bushing 84 in a fixed position within the pin bore 64, as will be described in greater detail below. The bushing 84 may include predetermined contours 86, 88 which substantially correspond to the contour of the opposed channels 68, 70 respectively, as shown in FIG. 3B. On the other hand, the bushing 84 that does not have predetermined contours, as shown in FIG. 3A, may also be employed.

Referring to FIGS. 3A-6, the bushing 84 further includes a contact surface 90 that is disposed for rotational contact with the piston pin 24, thereby interconnecting the connecting rod assembly 10 to the piston 22. The contact surface 90 defines a pivot axis about which the piston pin 24 may rotate during movement of the piston 22 and connecting rod assembly 10 within the cylinder 14. To perform the desired objectives of countering high loads, facilitating load carrying capacity and resisting seizure, the bushing 84 may be constructed from a metal that is dissimilar from that of the connecting rod assembly 10, which reduces friction and scuffing that might otherwise occur between the piston pin 24 and the pin bore 64. However, a bushing 84 constructed from a polymer may also be employed to accomplish a similar end, where the polymer material is suitable for use within an internal combustion engine 12. Further, the bushing 84 may be constructed from a rolled material or flat stock material and subsequently worked to provide the substantially cylindrical shape corresponding to the inner circumference of the pin bore 64.

The contact surface 90 of the bushing 84 may further include at least a pair of grooves 92, 94 and opposed distal ends 96, 98, as shown in FIG. 3A. Where the bushing is constructed from a flat stock material the grooves may be machined prior to working the material to correspond to the inner circumference of the pin bore 64. The grooves 92, 94 may extend for a predetermined annular extent about the contact surface 90. However, the grooves 92, 94 may also extend entirely around the circumference of the contact surface 90, as shown in FIG. 3B. In either event, the grooves 92, 94 are disposed along at least a portion of the distal ends 96, 98 (FIGS. 5A and 5B), thereby essentially eliminating the need to deburr the small end after machining to provide a reduced width configuration, as will be described in greater detail below. The grooves 92, 94 may also facilitate lubrication during engine operation to reduce friction and thermal stress at the interface between the piston pin 24 and the contact surface 90 of the bushing. While the grooves 92, 94 are disposed on only a portion of the distal ends 96, 98, they may be disposed along the entire distal ends.

Referring to the exemplary illustration shown in FIGS. 2-5B, the small end of the connecting rod assembly 10 may include a stepped configuration. However, there exist situations where it is desirous to employ a connecting rod assembly having a reduced width design other than a stepped configuration. Accordingly, another connecting rod assembly manufactured according to an exemplary method is generally indicated at 110 in FIG. 6 where like numerals, increased by 100 with respect to exemplary illustration illustrated in FIGS. 2-5B, are used to designate like structure. The connecting rod assembly 110 is similar to the connecting rod assembly 10 shown in FIGS. 2-5 and so the description of the illustrated structure will not be repeated here except where expressly mentioned below.

Figure 6:
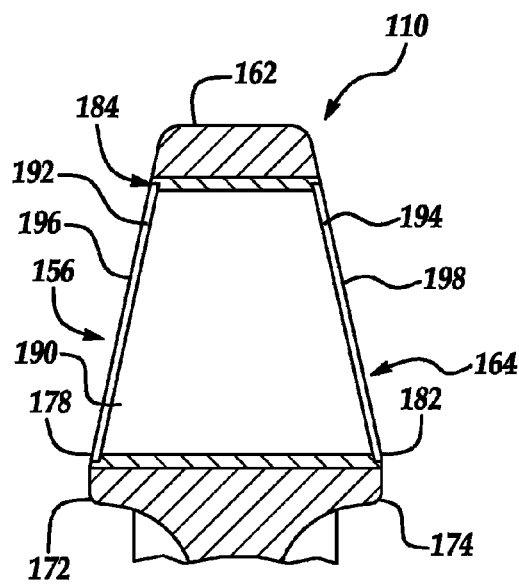
FIG. 6 is a fragmentary cross-sectional view of a small end of a connecting rod assembly having a bushing manufactured pursuant to another exemplary illustration.

Referring to FIG. 6, the connecting rod assembly 110 is shown having a small end 156 including a terminal end 162 and pin bore 164 extending therethrough. In this example, the small end 156 includes a trapezoidal configuration, and the connecting rod assembly 110 also includes a bushing, generally indicated at 184. The bushing 184 includes a predetermined outer diameter to facilitate installation in a fixed position within the pin bore 164, as described in greater detail below. The bushing 184 further includes a contact surface 190 that is disposed for rotational contact with the piston pin 24, thereby interconnecting the connecting rod assembly 110 to the piston 22.

The contact surface 190 of the bushing 184 further includes at least a pair of grooves 192, 194. The grooves 192, 194 may extend for a predetermined annular extent about the contact surface 190. However, the grooves 192, 194 may extend entirely around the circumference of the contact surface 190, as shown in FIG. 6. In either event, at least a portion of the grooves 192, 194 are disposed along the distal ends 196, 198 to essentially eliminate the need to deburr the small end 156 of the connecting rod assembly 110 after machining to create the trapezoidal configuration, as described in greater detail below. As further shown in FIG. 6, the grooves are annularly disposed along the entire circumference of the distal ends 196, 198. The grooves 192, 194 may also direct lubrication during engine operation to reduce friction and thermal stress at the interface between the piston pin 24 and the contact surface 190 of the bushing 184.

In the exemplary illustrations illustrated in FIGS. 2-6, the connecting rod assembly 10, 110 includes a bushing 84, 184. However, there exist situations where it is desirous to employ a connecting rod assembly without a bushing 84, 184. Accordingly, another connecting rod assembly manufactured according to an exemplary method is generally indicated at 210 in FIG. 7 where like numerals, increased by 200 with respect to the exemplary approach illustrated in FIGS. 2-5B, are used to designate like structure. The connecting rod assembly 210 is similar to the connecting rod assembly 10 shown in FIGS. 2-5B and so the description of the illustrated structure will not be repeated here except where expressly mentioned below.

Figure 7:
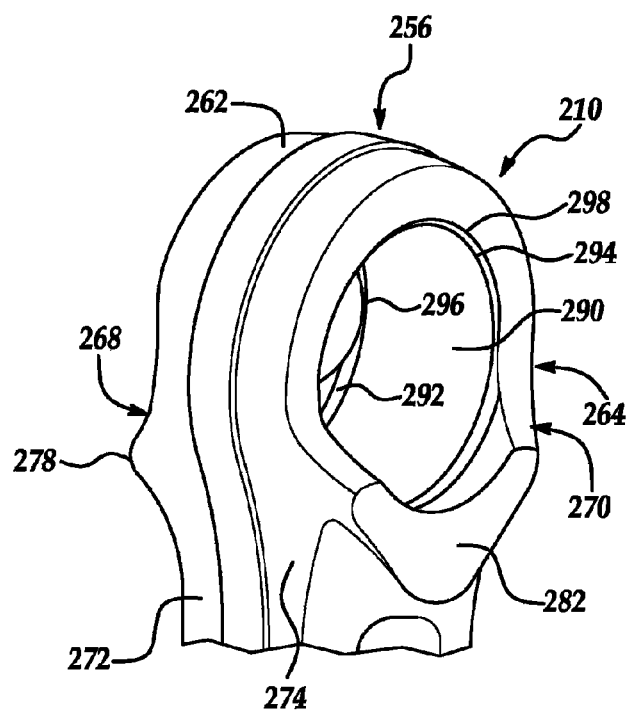
FIG. 7 is a fragmentary perspective view of yet another exemplary illustration of a small end of a connecting rod assembly manufactured pursuant to yet another exemplary approach.

Referring to FIG. 7, the connecting rod assembly 210 is shown having a small end 256 including a terminal end 262 and pin bore 264 extending therethrough. In this exemplary illustration, the inner circumference of the pin bore 264 is substantially cylindrical. However, the inner circumference of the pin bore 264 may also define a number of other shapes. Merely by way of example, the inner circumference of the pin bore 264 may be substantially oval or include a tapered profile to accommodate a particular style of piston pin 24. The pin bore 264 further includes a contact surface 290 operatively engaged by the piston pin 24, thereby interconnecting the connecting rod assembly 210 to the piston 22. The contact surface 290 is defined to provide a pivot surface between the connecting rod assembly 210 and the piston pin 24 to facilitate smooth linear and rotational movement of same within the cylinder 14 during engine 12 operation. The contact surface 290 includes at a pair of grooves 292, 294 and opposed distal ends 296, 298. The grooves 293, 294 may extend for a predetermined annular extent about the contact surface 290. However, the grooves may also extend entirely around the circumference of the contact surface 290, as shown in FIG. 7. In either event, at least a portion of the grooves 292, 294 are disposed along the distal ends 296, 298, thereby essentially eliminating the need to deburr the small end 256 of the connecting rod assembly 210 after machining to create the reduced width configuration, as described in greater detail below. The grooves 292, 294 may also direct lubrication during engine operation to reduce friction and thermal stress at the interface between the piston pin 24 and the contact surface 290. While the embodiment of the connecting rod assembly 210 shown in FIG. 7 includes a small end 256 having a stepped configuration, the small end 256 of the connecting rod assembly 210 may also have a trapezoidal configuration.

Referring to FIGS. 3A-5B, an exemplary method of manufacturing an exemplary connecting rod assembly 10 may include defining the small end 56 of the connecting rod having a terminal end 62. The small end 56 may be defined by any suitable process that is convenient. Merely as an example, the small end 56 may be defined via forging, casting or powder metallurgy. A pin bore 64 is also defined at the small end 56 may be preliminarily formed during this initial step of forging, casting, or powder metallurgy and later finish machined into the small end 56.

Where forging is employed, the step of defining the small end 56 includes heating a metal blank in to temperature where the metal may be pressed, stamped, or pounded into a predetermined form. The metal blank may then be placed into a die cavity having a predetermined form and subsequently forged to correspond to the predetermined form of the die cavity. Where casting is employed, the step of defining the small end 56 includes pouring molten metal into a mold cavity having a predetermined form and allowing the molten metal to cool to conform to the predetermined form of the mold cavity. Where powder metallurgy is employed, the step of defining the small end 56 includes compressing a metal powder within a die cavity to define a predetermined form and sintering the compressed powder to bond and conform the powder metal to the predetermined form of the die cavity. The connecting rod assembly 10 may also be machined from metal stock.

Once the small end 56 is defined, one exemplary method further includes forging a pair of channels 68, 70 on opposite sides 72, 74 of the small end 56 such that the axis of each of the channels 68, 70 is perpendicular to the axis of the pin bore 64. Where the forging process is employed to define the small end 56, the channels 68, 70 may be simultaneously forged therewith. Further, where casting or powder metallurgy is employed to define the small end 56, the channels 66, 68 may be incorporated during either of these processes.

The method of manufacture may further include forming a bushing 84 having a contact surface 90 including at least partially annular grooves 92, 94. The bushing 84 may be formed by any conventional method which may include the methods described above to define the small end 56 of a connecting rod 10. Accordingly, the above-identified methods are incorporated by reference herein relative to forming the bushing 84. Further, rather than forming the bushing 84 by casting, forging, machining or power metallurgy, the material for the bushing 84 may be cast, forged or machined as flat stock and subsequently shaped to conform to the circumference of the pin bore 64. Regardless of the process employed to form a bushing, the grooves 92, 94 may be machined, stamped, or otherwise defined within the bushing prior to shaping machining the small end to provide a reduced width configuration, as will be described in greater detail below. Merely by way of example, where a flat stock material is employed, the grooves 92, 94 may be formed therein prior to working the material to conform to the circumference of the pin bore 64.

A bushing 84 may then installed into the pin bore 64 of the small end 56. The bushing 84 is positioned in relative proximity to the pin bore 64 such that the axis of the pin bore 64 and the axis of the bushing 84 are substantially aligned. Specifically, the bushing 84 is positioned adjacent the ridges 76, 78 or 80, 82 of a channel 68 or 70, respectively, and inserted into the pin bore 64 until the bushing 84 is substantially centered within in the pin bore 64. Insertion occurs, e.g., by mechanically pressing the bushing 84 into the pin bore 64 to provide an interference fit between the bushing 84 and the pin bore 64, thereby maintaining the bushing 84 in a fixed position relative to the pin bore 64. In order to provide the interference fit between the bushing 84 and the pin bore 64, the outer diameter of the bushing 84 vary within micrometers relative to the inner diameter of the pin bore 64. However, the difference in diameters may not be so great as to compromise the fixed position of the bushing 84 relative to the pin bore 64 necessary during engine 12 operation.

The bushing 84 may also be installed into the pin bore 64 by creating a temperature differential between the bushing 84 and the small end 56. Accordingly, heating the small end 56 to provide thermal expansion of the pin bore 64 or cooling the bushing 84 to provide thermal contraction, or both, will affect the desired temperature differential and assist in the installation process. More specifically, under the effected temperature differential, the outer diameter of the bushing 84 will reduce and the inner diameter of the pin bore 64 will expand, thereby enabling the bushing 84 to be inserted within the pin bore 64. Upon achieving temperature equilibrium between the two components, the bushing 84 is fixed within the pin bore 64. The above-identified methods of installing a bushing 84 into a pin bore 64 are merely exemplary, and the step of installing a bushing 84 within a pin bore 64 may be accomplished by any method that is convenient.

Once the bushing 84 is installed into the pin bore 64, a contact surface 90 may be defined within the small end 56. Referring to FIGS. 4-5B, a machining tool, generally indicated at 300, may engage the inner circumference of the bushing 84 to define the contact surface 90 which facilitates smooth rotational movement of the piston pin 24 during engine 12 operation. As shown in FIG. 4, the machining tool 300 may include a rotary driven shaft 302 and a cutting head 304. The cutting head 304 includes a plurality of pads 306 which support the cutting head 304 during rotational movement within the pin bore 64. The cutting head 304 further includes a plurality of cutting faces 308 that define the contact surface 90. As a result of the channels 68, 70 and the ridges 76, 78 and 80, 82 formed therefrom, the machining tool 300 will finish machine the contact surface 90 to the appropriate inner diameter for a particular application without incurring the moment forces associated with finish machining the contact surface of a small end having a reduced width upper region with respect to the remaining portion of the small end. The contact surface 90 may be defined by any suitable machining tools, such as a CNC machine or other type of cutting tool suitable for defining a contact surface 90 within the small end 56 of a connecting rod assembly 10.

The small end 56 of the connecting rod assembly 10 may be subsequently machined to reduce the width between each channel 68, 70 and the terminal end 62, thereby providing a stepped configuration (FIGS. 5A and 5B). More specifically, the small end 56 is machined to remove a predetermined portion between the ridges 78, 82 of each channel 68, 70 and the terminal end 62. Thus, this machining step acts to substantially remove the ridges 76, 80. Whether the bushing is a conventionally shaped bushing or it includes predetermined contours 86, 88 corresponding to the contour of the channels 68, 70, as described with respect to FIGS. 3A and 3B above, a predetermined amount of the bushing 84 is also removed during the machining of the small end 56 to provide the stepped configuration.

More particularly, during machining of the small end 56, a predetermined amount of the bushing 84 may be removed such that the grooves 92, 94 are disposed along at least a portion of the distal ends 96, 98. Where at least a portion of the grooves 92, 94 are disposed along the distal ends 96, 98 the need for the small end 56 of the connecting rod 10 to undergo a subsequent deburring process is essentially eliminated.

Similarly, the exemplary connecting rod assembly shown in FIG. 6 may be manufactured according to the method described above with reference to FIGS. 3A-5B. However, the step of machining the small end of the connecting rod assembly to provide a stepped configuration is replaced by machining the small end to provide a trapezoidal configuration. More specifically, the small end 156 is machined to remove a predetermined portion between the ridges 178, 182 and the terminal end 162, thereby substantially removing the ridges 176, 180. Accordingly, by machining the small end 156 of the connecting rod assembly 110 to provide a trapezoidal configuration, at least a portion of the grooves 192, 194 are disposed along the distal ends 196, 198. Alternatively, where a particular application of the connecting rod assembly 110 requires a more pronounced trapezoidal configuration, the small end 156 may be machined to remove a predetermined portion of the ridges 178,180 as well as the ridges 176, 182 to provide the desired trapezoidal configuration. This alternative method would provide the same advantages of essentially eliminating moment forces during installation of the bushing 184 and final machining of the contact surface 190 as well as essentially eliminating the need for a deburring process as at least a portion of the grooves 192, 194 are disposed along the distal end 196, 198. As shown in FIG. 6, the grooves may extend entirely around the distal ends 196, 198.

Referring to the exemplary illustration shown in FIG. 7, the connecting rod assembly 210 may be manufactured according to an alternative method of manufacture to that described with respect to FIGS. 3-6. While similar to the method of manufacture described with respect to FIGS. 3-6, the connecting rod assembly 210 shown in FIG. 7 does not include a bushing 84, 184. Rather, the pin bore 264 of the small end 256 includes at least partially annular grooves 292, 294 adjacent the distal ends 296, 298 of the pin bore 264. The method of manufacture represented by the embodiment illustrated in FIG. 7 includes defining a small end 256 of a connecting rod 210 having a terminal 262 and defining a pin bore 264 extending through the small end 256. The small end 256 may be defined by any suitable process known in the art such as forging, casting or powder metallurgy, as described above relative to FIGS. 3A-6 is incorporated by reference herein. The pin bore 264 defined at the small end 256 may also be formed during the initial step of forging, casting, or powder metallurgy or may be later machined into the small end 256.

An exemplary method of manufacturing the connecting rod assembly 210 may further include forming a pair of channels 268, 270 on opposite sides 272, 274 of the small end 256 such that the axis of each of the channels 268, 270 is perpendicular to the axis of the pin bore 264, e.g., as described relative to FIGS. 3-5B and incorporated by reference herein. At least partially annular grooves 292, 294 may also be formed along the contact surface 290 of the pin bore 264 adjacent the distal ends 296, 298. Alternatively, the grooves 292, 294 may be machined into the contact surface 290 in a subsequent step once the small end 256 is defined. However, where the forging process is employed to define the small end 256, the grooves 290, 292 may be simultaneously forged therewith. Further, where casting or powder metallurgy is employed to define the small end 256, the grooves 290, 292 may be incorporated during either of these processes and subsequently machined to proper specifications for the desired application.

The small end 256 of the connecting rod assembly 210 may then be machined to reduce the width between each channel 268, 270 and the terminal end 262, to provide a stepped configuration as described with reference to the embodiment shown in FIGS. 3A-6. More specifically, during machining of the small end 256, a predetermined amount of the pin bore 264 may be removed such that at least a portion of the grooves 292, 294 are disposed along the opposed ends of the pin bore 264. Where at least a portion of the grooves 292, 294 are disposed along the opposed ends of the pin bore 264, the need for the small end 256 of the connecting rod 210 to undergo a subsequent deburring process is essentially eliminated.

The reduced width configuration, shown throughout the figures, may generally reduce weight and improves lubrication between the connecting rod assembly 10 and the piston 22 to counter the high loads, temperature, gas pressure and inertial forces localized at this area. In the absence of such heightened properties, the piston 22 and connecting rod assembly 10 may scuff and ultimately fail. Likewise, it is important to ensure that the pivot point between the piston 22, connecting rod assembly 10 and piston pin 24 remains resistant to thermal stress and load fatigue while maintaining good friction and wear resistant properties during operation of the engine 12.

Exemplary methods as described herein may generally overcome disadvantages of the related art, e.g., by improving the installation of a bushing into a pin bore of a connecting rod having a reduced width small end, thereby prolonging the life of the relative components of an internal combustion engine without undue wear resulting in "out of tolerance" conditions. Further, the pair of channels on opposite sides of the small end may provide a coplanar area adjacent the pin bore that acts to reduce the moment forces generated when installing the bushing into the pin bore, thereby reducing the likelihood of deforming the bushing and creating an irregular contact area between the bushing, the pin bore, as well as between the bushing and the piston pin. Exemplary methods may produce a connecting rod having a reduced weight by reducing the width of the small end. Further, the exemplary methods may generally reduce the cost of manufacturing by reducing the need for inspection of improper bushing installation within the small end caused by moment force.

To further overcome various disadvantages of the related art, exemplary methods may improve lubrication and streamline manufacturing by providing at least partially annular grooves along the contact surface within the small end of the connecting rod assembly. For example, grooves may be disposed adjacent the distal ends of the small end of the connecting rod assembly. As a result of machining of the small end, to provide a reduced width configuration, at least a portion of the each groove is then disposed along a distal end of the small end of the connecting rod assembly. In this manner, the need to subsequently deburr the machined area of the small end is greatly reduced, thereby streamlining the manufacturing process. Lubrication along the pivot point between the small end and the piston pin is also improved as a result of the location of the grooves after machining to provide the reduced width configuration.

Figures 8A, 8B:
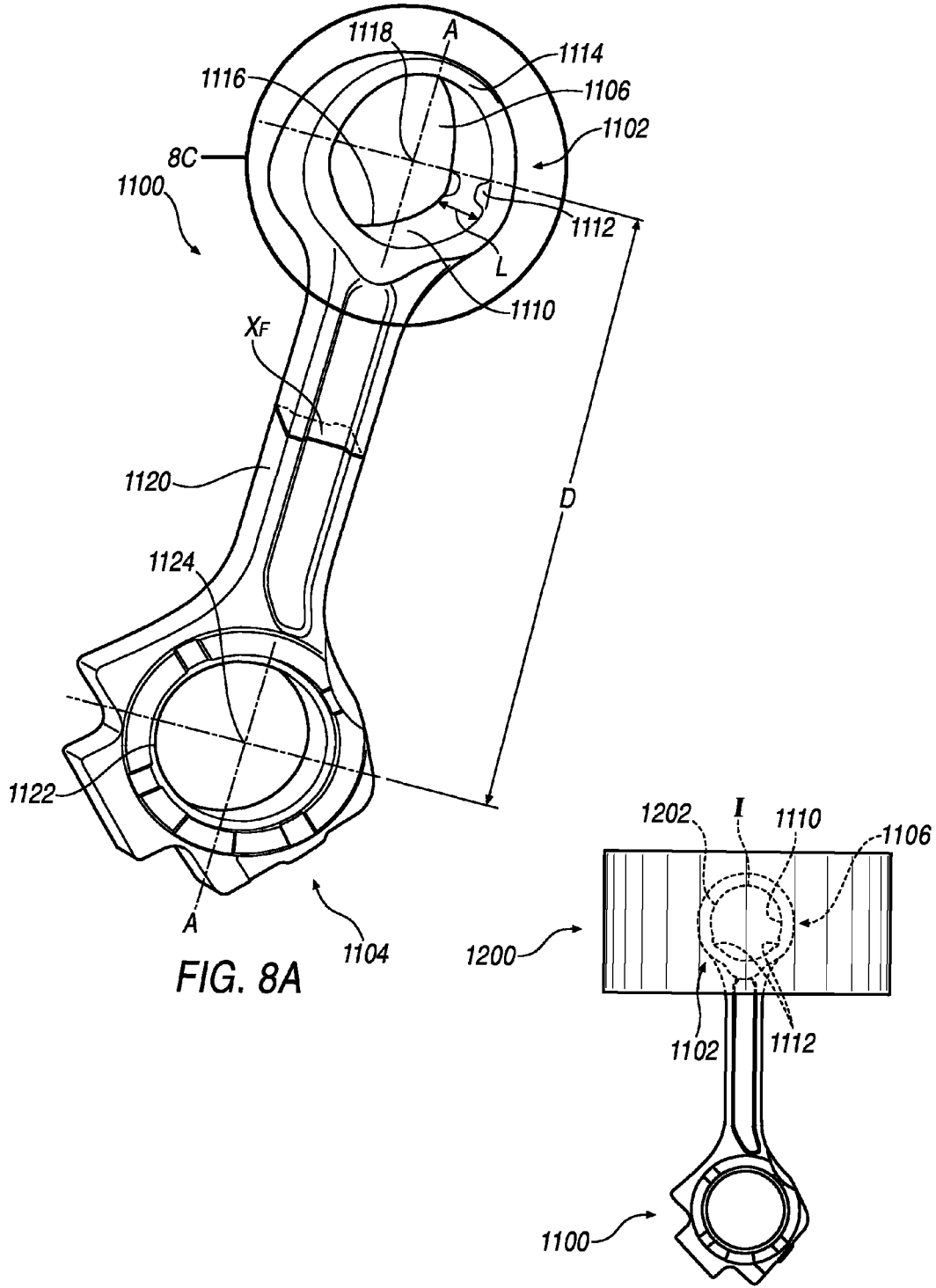
FIG. 8A is an elevated perspective view of another exemplary connecting rod.
FIG. 8B is a side view of the connecting rod shown in FIG. 8A assembled with a piston main body and a piston pin.
Figure 9C:
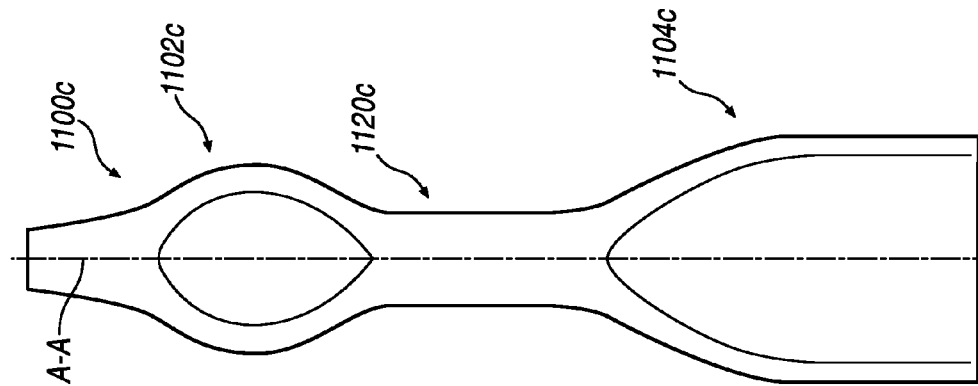
FIG. 9C is a side view of the formed connecting rod blank of FIG. 9B after a subsequent forming operation.
Figure 9B:
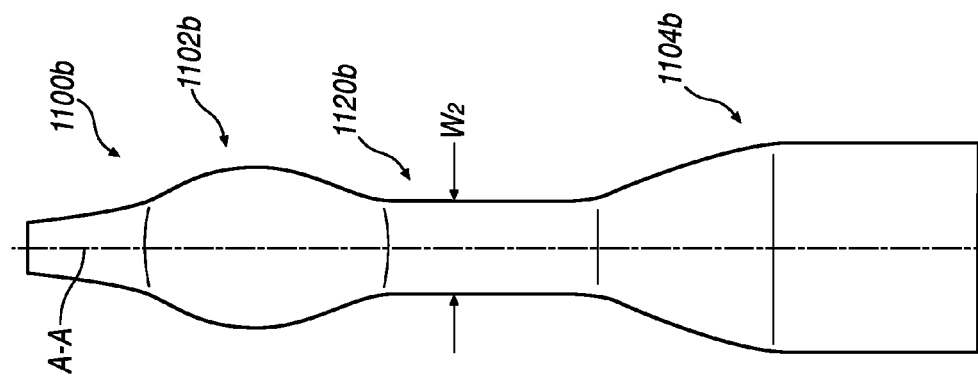
FIG. 9B is a side view of the connecting rod blank of FIG. 9A after an initial forming operation.
Figure 9A:
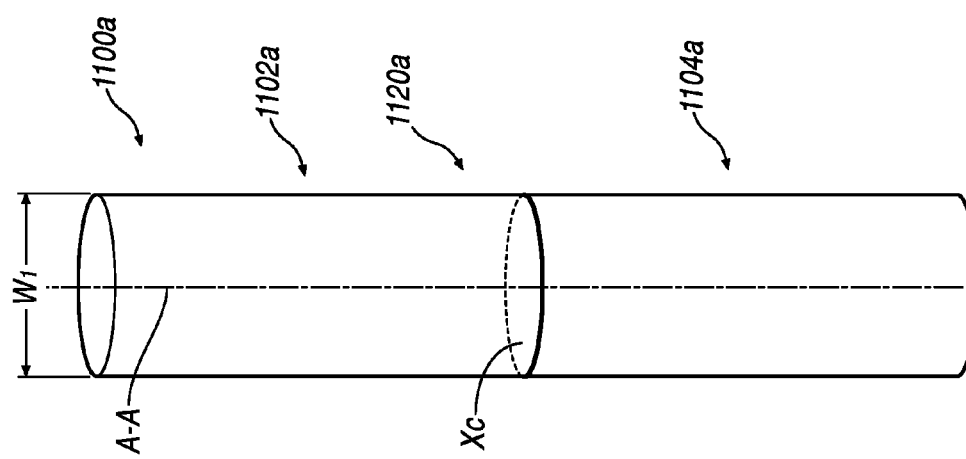
FIG. 9A is a side view of an exemplary connecting rod blank.
Figure 9D:
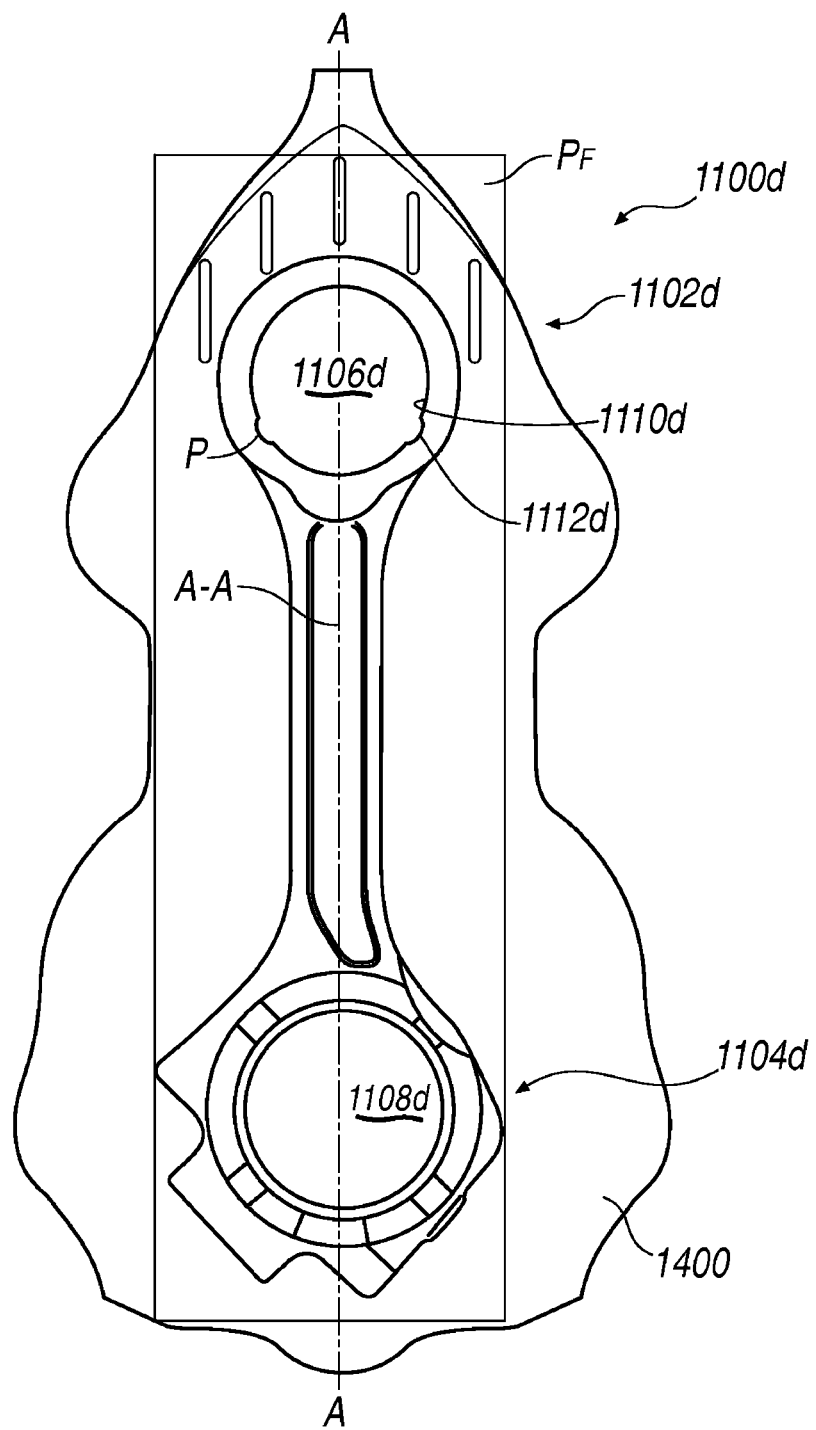
FIG. 9D is a side view of the formed connecting rod blank of FIG. 9C after a subsequent forming operation to produce a connecting rod having a material flash.
Figure 9E:
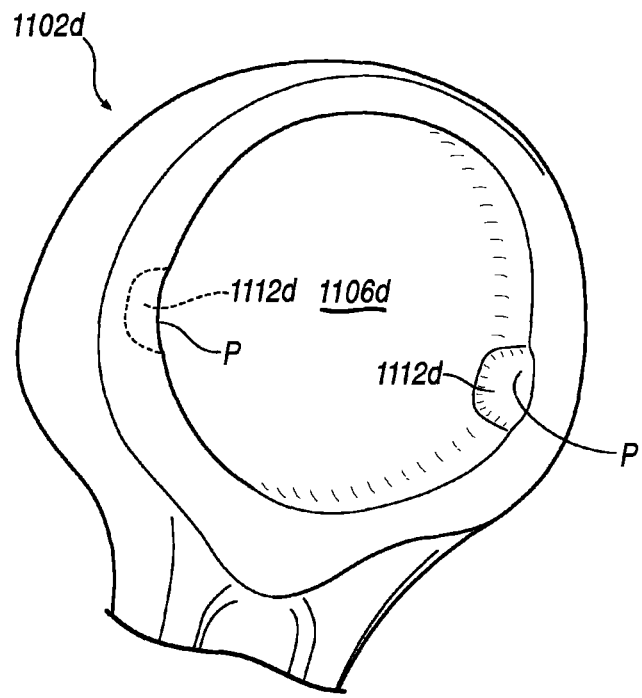
FIG. 9E is an enlarged perspective view of the piston pin end of the connecting rod in FIG. 9D.
Figure 9F:
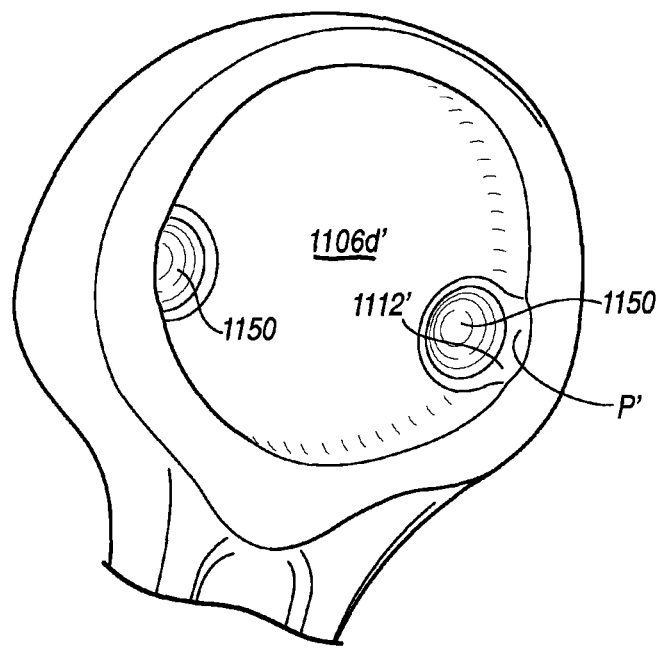
FIG. 9F is an enlarged perspective view of an alternative illustration of the piston pin end of the connecting rod in FIG. 9D.
Figure 9G:
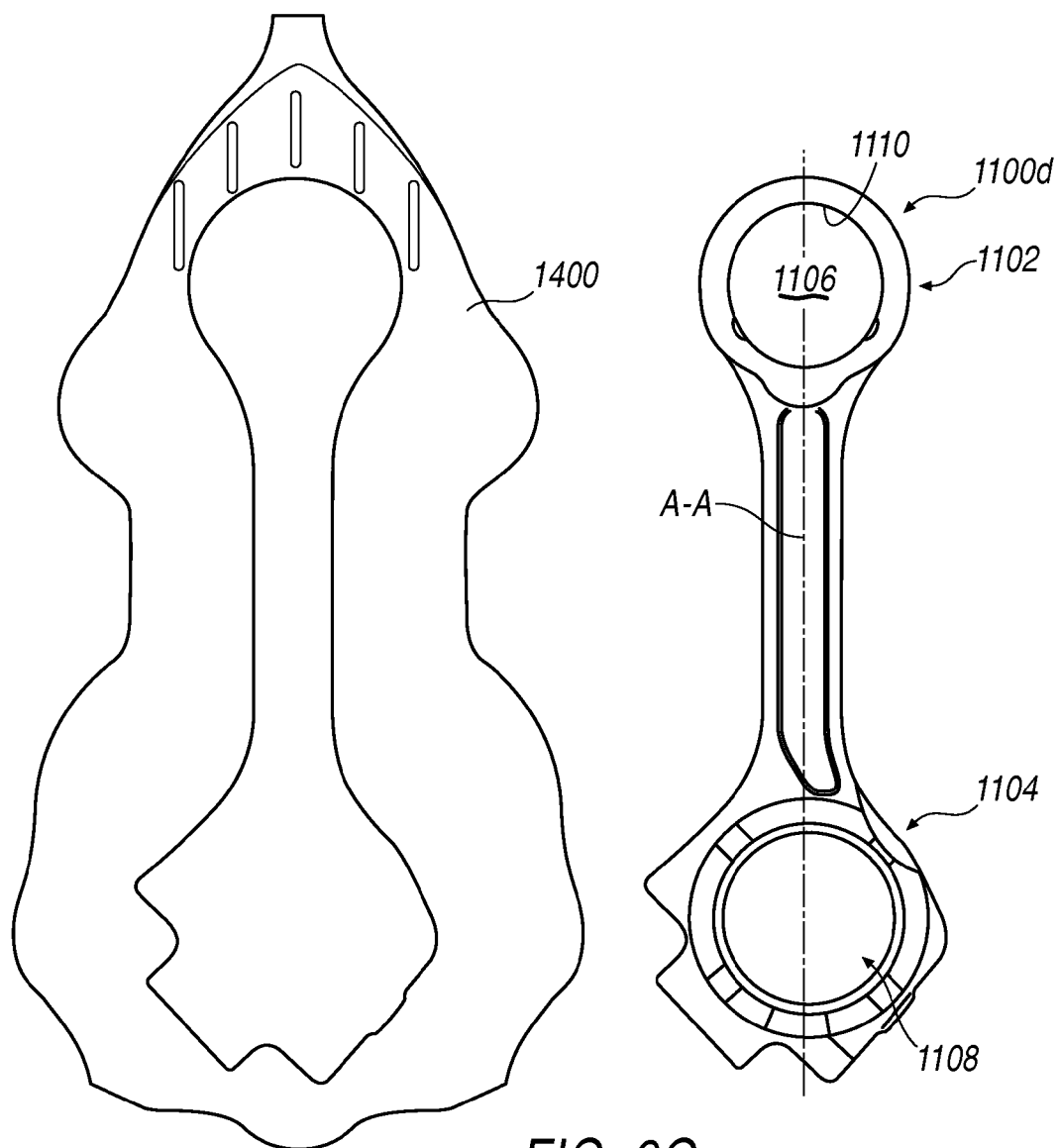
FIG. 9G is a side view of a the formed connecting rod of FIG. 9D with the material flash removed from the connecting rod.
Figure 10:
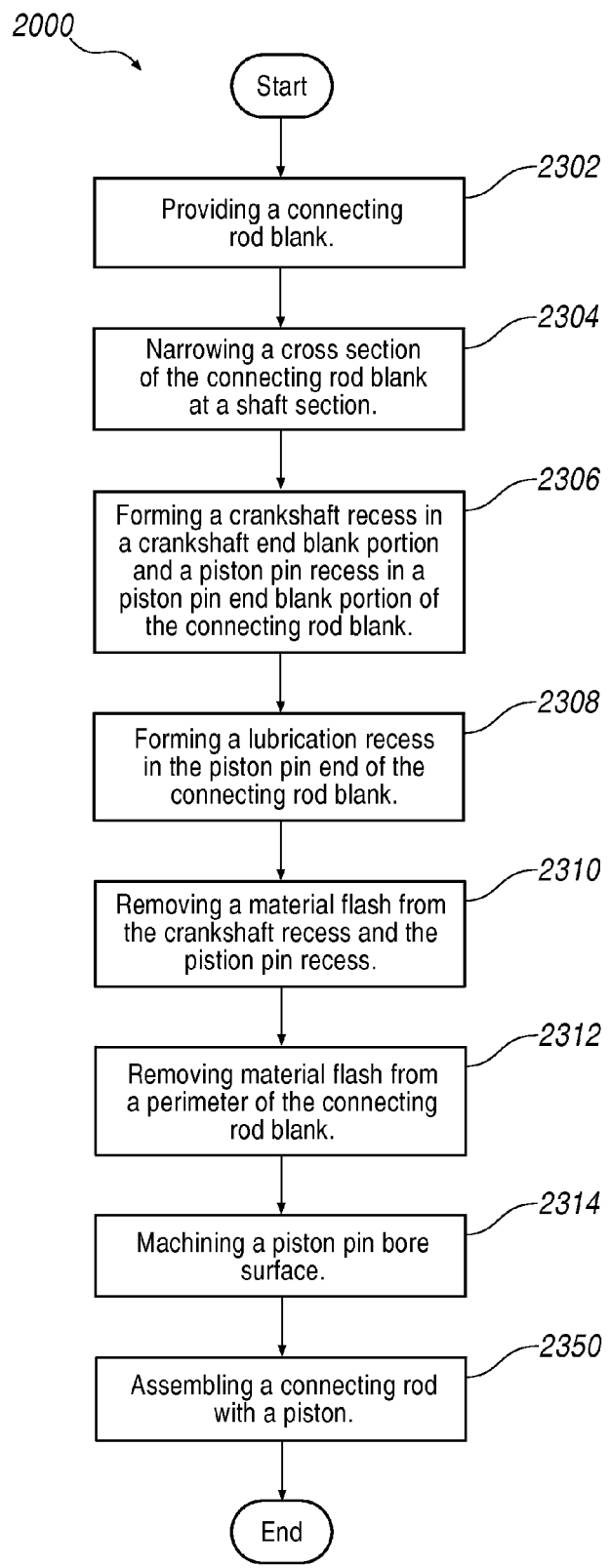
FIG. 10 is a process flow diagram of an exemplary connecting rod forming process.

Turning now to FIGS. 8-10, further exemplary illustrations of a connecting rod and methods of making the same are disclosed. Referring now to FIG. 8A, an exemplary connecting rod 1100 is shown. The connecting rod 1100 includes a piston pin or small end 1102 and a crankshaft or large end 1104. The piston pin end 1102 includes a piston pin bore 1106 that defines a piston pin bore surface 1110. The piston pin bore surface 1110 includes at least one lubrication recess 1112 located at the piston pin bore surface 1110. The piston pin bore surface 1110 includes a longitudinal surface L that extends between a front face 1114 and a rear face 1116 of the piston pin end 1102. The lubrication recess 1112 extends through only a portion of the longitudinal surface L of the piston pin bore surface 110. A method of making the connecting rod 1100 is also disclosed at least in FIG. 10, where the lubrication recess 1112 and the piston pin end recess 1106 may be defined concurrently in forming steps 2306 and 2308 that create the lubrication recess 1112.

Referring back to FIG. 8A, the connecting rod 1100 includes a shaft 1120 extending between the piston pin end 1102 and the crankshaft end 1104. The shaft 1120 may include a generally I-shaped cross-section $X_F$ typical of connecting rods. It should be noted that the cross-section $X_F$ of the shaft 1120 may include any generally quadrangular section, such as, for example, a square or generally rectangular cross section. The piston pin bore 1106 of the piston pin end 1102 defines a piston pin bore center 1118. The crankshaft or large end 1104 generally defines a crankshaft pin bore 1122 that has a crankshaft pin bore center 1124. The ends 1102 and 1104 of the connecting rod 1100 cooperate to generally define a longitudinal axis A-A of the connecting rod 1100.

The piston pin bore surface 1110 includes one of more lubrication recesses 1112 that extend along only a portion of the longitudinal surface L of the piston pin bore surface 1110. The lubrication recesses 1112 may be depressions or indentations located in the piston pin bore surface 1110. More particularly, the lubrication recesses 1112 may be used to accumulate a lubricant, such as, for example, oil or coolant during operation when the connecting rod 1100 is assembled in a piston assembly. Turning now to FIG. 8B, as the connecting rod 1100 assembled with a piston. More specifically, the connecting rod 1100 may be assembled to a piston main body 1200 by way of a piston pin 1202. In other words, a piston pin 1202 may be received in the piston pin end 1102 of the connecting rod 1100, i.e., within piston pin bore 1106, thereby generally securing the connecting rod 1100 to the piston 1200. In one example the piston 1200 may be assembled within a cylinder of an internal combustion engine. An interface I between the piston pin bore 1110 of the connecting rod 1100 and the piston pin 1202 typically experiences continuous radial loads from the piston pin 1202 during operation. The lubrication recesses 1112 may be provided in an effort to enhance lubrication between the piston pin 1202 and the piston pin bore surface 110, as the lubrication typically accumulates within the lubrication recesses 1112, thereby increasing the amount of lubrication at the interface I.

Figure 8C:
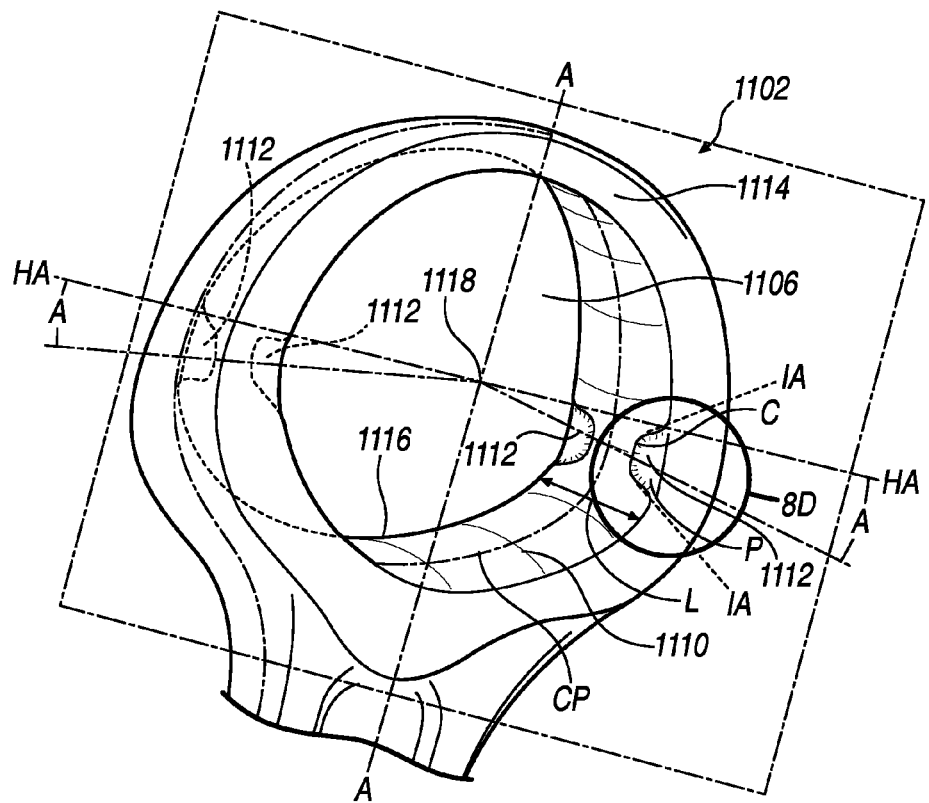
FIG. 8C is an enlarged elevational perspective view of a piston pin end of the connecting rod.

FIG. 8C is an enlarged view of the piston pin or small end 1102. The piston pin bore surface 1110 includes several lubrication recesses 1112 that extend along only a portion of the longitudinal surface L such that the lubrication recess 1112 intersects only one of the front face 1114 and the rear face 1116 of the piston pin end 1102. That is, the lubrication recess 1112 may not generally extend into a central portion CP of the longitudinal surface L, where the central portion CP is illustrated as a plane intersecting the piston pin end 1102. The outer surface of the lubrication recesses 1112 within the piston pin bore surface 1110 may be defined by the outer profile P of the lubrication recess 1112. That is, the outer profile P defines the depth and shape of the indentations that create the lubrication recesses 1112. In one illustrative example the profile P of the lubrication recesses 1112 may include a depth D (illustrated in FIG. 8D) of about 0.019 inches (0.50 mm) within the piston pin bore surface 1110.

The lubrication recess 1112 may include a generally tapered contour C. The contour C represents a boundary between the piston pin bore surface 1110 and the outer profile P of the lubrication recess 1112, where the contour C generally indicates the position of the lubrication recess 1112. The contour C of the lubrication recesses 1112 may be tapered inwardly, towards the central portion CP of the longitudinal surface L. That is, the contour C may be formed at an inward angle IA, oriented towards the central portion CP. It should be noted that while FIGS. 8A and 8C illustrate the contour C of the lubrication recesses 1112 having a generally tapered profile, the contour C may include other profiles as well. For example, in one alternative illustration the contour C includes a semi-circular profile.

The contour C may be generally finished in a machining operation that removes material and creates a final finish of the piston pin bore surface 1110. That is, the boundary between the piston pin bore surface 1110 and the lubrication recess 1112 may be substantially defined in a machining operation. It should be noted that while the machining operation of the piston pin bore surface 1110 generally defines the contour C, i.e., the boundary between the piston pin bore surface 1110 and the lubrication recess 1112, the outer profile P of the lubrication recess 1112 remains generally unaffected, as the outer profile P is generally defined by the border between the front face 1114 and the lubrication recess 1112. In other words, a finishing or machining operation working upon the piston pin bore surface 1110 may alter the inner contour C while generally leaving the outer profile P unaffected.

FIG. 8C illustrates two lubrication recesses 1112 located along the front face 1114 generally disposed approximately one hundred and eighty degrees (1180°) with respect to each other and two lubrication recesses 1112 located along the rear face 1116 also 1114 generally disposed approximately one hundred and eighty degrees (1180°) with respect to each other, where the lubrication recesses 1112 located at the front face 1114 generally oppose the lubrication recesses 1112 on the rear face 1116. However, it is understood that other arrangements and any number of lubrication recesses 1112 may be provided as well. The lubrication recesses 1112 may also be positioned at an angle A measured from a horizontal axis HA of the piston pin bore 1106, where the horizontal axis HA may be oriented generally perpendicular to the axis A-A of the connecting rod 1100. The angle A may be any angle up to about ninety degrees (90°) in either direction. It should be noted that the lubrication recesses 1112 may also be positioned such that the angle A is about zero degrees (0°), that is, the lubrication recesses 1112 may be generally aligned with the horizontal axis HA.

In one example, the piston pin bore surface 1110 may be generally curved, where the piston pin bore surface 1110 includes a substantially convex surface that is curved inwardly towards the piston pin bore center 1118 when viewed along the longitudinal surface L. Including a longitudinal surface L that is substantially convex may be advantageous, because the piston pin 1202 (illustrated in FIG. 8B) may experience some degree of bending during operation of the piston cylinder assembly 20. A generally curved longitudinal surface L may accommodate at least a portion of the bending of the piston pin 1202. The piston pin bore surface 1110 may also include an anti-friction coating applied along at least a portion of the piston pin bore surface 1110. The anti-friction coating may be any coating that improves wear or scuffing resistance of the piston pin bore surface 110, such as, but not limited to, a manganese-phosphate coating. Moreover, although the piston pin bore 1106 is illustrated as a bushingless pin bore, it should be noted that a bushing may be included within the piston pin bore 1106 as well, where the lubrication recesses 1112 may be formed along a surface of the bushing that contacts a piston pin, such as the piston pin 1202 illustrated in FIG. 8B.

Figure 8D:
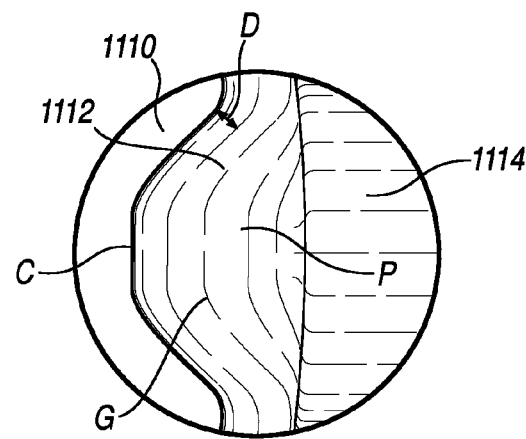
FIG. 8D is magnified view of a lubrication recess of the piston pin end of the connecting rod.

At least the piston pin end 1102 of the connecting rod 1100 may be constructed from a metal based material. Merely as examples, some metals that may be used include steel, aluminum, or titanium. Turning now to FIG. 8D, a magnified illustration of one of the lubrication recesses 1112 of the piston pin bore surface 1110 illustrates a grain flow G. The grain flow G may be lines located at the surface of the lubrication recess 1112 that indicate the orientation of the constituents of the metal when a forming process is used to create the lubrication recess 1112.

FIG. 8D illustrates the grain flow G at the lubrication recess 1112 oriented to generally correspond to the outer profile P. That is because the lubrication recess 1112 may be created by a metal forming process, such as, but not limited to, forging. Metal forming processes typically orient the grain flow G to follow the direction of metal deformation during the forming process. Including a grain structure G that generally follows the direction of metal deformation may result in enhanced material properties, such as, for example, increased strength, ductility, resistance to impact, or fatigue. Creating the lubrication recess 1112 by a metal working operation such as forging may be advantageous, especially when compared to a material removal operation, such as machining. This is because machining would not typically orient the grain flow G to be substantially aligned with the outer profile P, because material is only removed during a machining operation. That is, FIG. 8D illustrates the grain flow G as lines that are generally parallel to one another, and are substantially aligned to correspond with the outer profile P. Therefore, machining the outer profile P into the piston pin bore surface 1110 would not typically result in the increased material properties that may be experienced during forming.

Proceeding to FIGS. 9A-9E, an exemplary process for forming the connecting rod 1100 will be described. In FIG. 9A, a connecting rod blank 1100a may be provided. The connecting rod blank 1100a may include a piston pin end blank portion 1102a, a crankshaft end blank portion 1104a, and a shaft blank portion 1120a. The connecting rod blank 1100a may be generally circular in cross-section, which is illustrated as cross section $X_C$. The connecting rod blank 1100a may also include a generally uniform cross sectional width $W_1$.

Turning now to FIG. 9B, the connecting rod blank 1100a is narrowed along the connecting rod blank 1100a to form a shaft blank portion 1120b of a connecting rod 1100b. At least a portion of the shaft blank portion 1120b may include a narrower cross section, where the cross sectional width $W_1$, illustrated in FIG. 9A, is generally reduced to a width $W_2$ in FIG. 9B. In one example, the shaft blank portion 1120b may be narrowed by a roll forming operation that generally works directly upon at least a portion of the shaft blank portion 1120b.

Referring now to FIG. 9C, a connecting rod blank 1100c is shown having a having a generally quadrangular-sectioned piston pin end 1102c and crankshaft end 1104c. This transitional shape may result from a pre-forging operation that generally forms the connecting rod 1100c to a quadrangular-sectioned shape that is generally between the initially round shape shown in FIGS. 9A and 9B, and the final quadrangular-sectioned shape of the connecting rod (e.g., as shown in the perspective view of FIG. 8A). The transitional shape shown in FIG. 9C may allow a subsequent forging or other forming operation to more easily form a desired final shape of the connecting rod 1100.

Turning now to FIG. 9D, a connecting rod blank 1100d is illustrated after the forming of a piston pin end 1102d and the crankshaft end 1104d is generally complete, with the exception of initial recesses 1106d, 1108d. The recesses 1106d, 1108d have a material flash such that the opening does not extend all the way through the piston pin end 1102d or crankshaft end 1104d in an axial direction. The material flash is thus subsequently removed to form the bores 1106, 1108. The blank 1100d also includes a material flash 400 generally extending about the perimeter of the connecting rod 1100d. As shown in FIG. 9D, the material flash 400 is generally disposed in a plane $P_F$ that is generally parallel with the longitudinal axis A-A of the connecting rod 1100b. The lubrication recesses 1112d may also be formed at the piston pin bore 1106d and located along a piston pin bore surface 110d. The formation of the connecting rod 1100 is thus generally complete in connecting rod blank 1100d, with the exception of the material flash 400 and the material flash within openings 1106d and 1108d.

FIG. 9E is an enlarged perspective view of the piston pin recess 1106d, before the material flash within the recess 1106d is removed. The outer profile P of the lubrication recess 1112 has been substantially defined by the forming of the piston pin end 1102d. That is, the outer profile P of the lubrication recess 1112 includes a final predetermined configuration. The final predetermined configuration may be defined as the general overall outer profile P of the lubrication recess 1112 included with the substantially complete connecting rod (illustrated in FIGS. 8A-8D and 3E). That is, the final predetermined configuration of the lubrication recesses 1112 may be included with the connecting rod 1100 assembled to the piston 1200, such as the connecting rod and piston assembly illustrated in FIG. 8B. It should be noted that while the outer profile P of the lubrication recesses 1112 may be substantially complete before the material flash within the recess 1106d is removed, the contour C (FIG. 8C) may be altered or changed in a finishing or machining operation. Specifically, a machining operation removing material and creating the final finish of the piston pin bore surface 1110 may still need to occur, thereby defining the contour C of the lubrication recesses 1112, while generally not affecting the outer profiles P of the lubrication recesses 1112.

In one example, the lubrication recess 1112d may be defined in a separate forming operation from the forming of the piston pin recess 1106d. That is, the forming of the lubrication recess 1112d and the forming of the piston pin bore 1106d may be separate operations. Alternatively, in another example the predetermined final configuration of the outer profile P may be defined concurrently with the forming of the piston pin bore 1106d.

FIG. 9F is an alternative illustration of a piston pin recess 1106d', where generally circular depressions 1150 may be included within the material flash of the piston pin recess 1106d'. In one exemplary illustration, the circular depression 1150 may be formed concurrently during the same operation that creates the lubrication recesses 1112d, the recess 1106d, or both. The overall shape of the depressions 1150 may define at least a portion of the outer profile P' of the lubrication recesses 1112'. Thus, the depressions 1150 may facilitate the formation of at least a portion of the outer profile P' of the lubrication recesses 1112'. In one example, the depressions 1150 may be substantially cone shaped indentations that extend into the piston pin recess 1106d'.

Referring now to FIG. 9G, a generally complete connecting rod 1100 is illustrated. The connecting rod 1100 now has the material flash 400 and the material flash from openings 1106d and 1108d (illustrated in FIG. 9D) removed by a material removal process. The material flash 400 and the material flash from openings 1106d and 1108d that is removed may all be generally disposed in the plane $P_F$ (illustrated in FIG. 9D).

In one example, the removal of the material flash from the openings 1106d and 1108d may be performed by a machining operation, although it is understood that other approaches may be used as well.

The piston pin bore 1110 may then undergo a machining operation removing material and creating the final finish of the piston pin bore surface 1110. The machining operation may substantially define the contour C of the lubrication recesses 1112, while the outer profile P of the lubrication recess 1112 remains generally unaffected. Moreover, the piston pin bore surface 1110 may also undergo a coating operation, where at least a portion of the piston pin bore surface 1110 may be coated with an anti-friction coating. The material removal process may define at least a portion of the contour C as well as the piston pin bore surface 1110 (illustrated in FIG. 8C), where the contour C represents the boundary between the piston pin bore surface 1110 and the lubrication recess 1112.

With specific reference to FIG. 3, a process 2000 for forming a connecting rod and/or assembling a piston is described. Process 2000 generally begins at steps 2302 to 2312, where the connecting rod is initially produced or formed. In step 2302, a connecting rod blank is provided. For example, the connecting rod blank 1100a may include the piston pin end blank portion 1102a, the crankshaft end blank portion 1104a, the shaft blank portion 1120a, and the generally uniform cross section $X_C$. Process 2000 may then continue to step 2304.

In step 2304, the cross-sections of the connecting rod blank may be generally narrowed at the shaft section. For example, as described above, a roll forming operation may be employed to narrow a width $W_1$ of cross-section $X_C$ of the initial connecting rod 1100a to a reduced width $W_2$ of the narrowed connecting rod 1100b. Furthermore, the roll forming operation may be performed generally at or around at least a portion of the shaft blank portion 1120b. The narrowing of the shaft blank portion 1120b also work hardens the material, thereby hardening and strengthening the narrowed portions of shaft blank portion 1120b. Process 2000 may then continue to step 2306.

In step 2306, the piston pin recess 1106d and the crankshaft pin recess 1108d may be formed in the connecting rod blank. For example, as described above, the piston pin recess 1106d and the crankshaft pin recess 1108d may be formed in the second connecting rod blank 1100a in a series of forging operations as shown in FIGS. 9B-9D. FIG. 9D illustrates the recesses 1106d, 1108d having the material flash such that the opening does not extend all the way through the piston pin end 1102d or crankshaft end 1104d in an axial direction. The material flash is thus subsequently removed to form the bores 1106, 1108. Process 2000 may then continue to step 2308.

In step 2308, the at least one lubrication recess 1112d may be formed in the piston pin end 1102d of the connecting rod blank 1100d. As discussed above, the lubrication recess 1112d includes an outer profile P having a final predetermined configuration, where the predetermined final configuration of the outer profile P may be substantially defined by forming the lubrication recess 1112. The piston pin end 1102d and the crankshaft end 1104d may be generally complete, with the exception of material flash such that the opening does not extend all the way through the piston pin end 1102d and the crankshaft end 1104d in an axial direction.

The step 2308 of forming the lubrication recess 1112d may be a separate forming operation from the step 2306 of forming the piston pin recess 1106d. Alternatively, in another example the step 2308 of forming the lubrication recess 1112d may be included in the step 2306 of forming of the piston pin bore 1106d. That is, the lubrication recess 1112d and the piston pin bore 1106d may both be formed concurrently in the same forming operation. Process 2000 may then continue to step 2310.

In step 2310, the material flash within the openings of the piston pin recess and the crankshaft recess may be removed. For example, the connecting rod blank 1100d may be generally complete, with the exception of initial recesses 1106d, 1108d. The recesses 1106d, 1108d have a material flash such that the opening does not extend all the way through the piston pin end 1102d or crankshaft end 1104d in an axial direction. The material flash is thus subsequently removed to form the bores 1106, 1108. For example, the piston pin bore and the crankshaft pin bore may be machined to remove the material flash from the openings 1106d and 1108d, although it is understood that other approaches may be used as well.

The piston pin bore 1106 may be formed in the connecting rod 1100 by any combination of forming operations, such as forging operations. In other words, as described above in regard to FIGS. 9B, 9C and 9D and 9E, the piston pin bore 1106 may be generally formed in a series of forging operations such as hot forging. Any other method for forming piston pin bores may be employed.

The steps 2304, 2306, 2308 may also generally shape an initially round or circular cross-section of the connecting rod blanks 1100a into a generally quadrangular cross-section. In other words, any of the forging, rolling, or other operations described herein may work a perimeter of the connecting rod blanks about the shaft 1120, thus shaping an initially round cross-section of the blanks (e.g., as best seen in FIG. 9A) to a generally quadrangular cross section defining at least four generally flat sides. For example, the round cross-section initially present at FIG. 9A may be shaped into a generally I-shaped cross-section $X_F$ typical of connecting rods, as seen in FIG. 8A. Other examples of generally quadrangular cross-sections may include those that are generally square, generally rectangular, or the like.

Proceeding to step 2312, a material flash 400 may be removed from a perimeter of the connecting rod blank 1100 after the narrowing operation. The material flash 400, as seen best in FIG. 9D, is generally disposed in a flash plane $P_F$ that includes the longitudinal axis A. In other words, the flash plane $P_F$ typically extends along an entire length of the preformed connecting rod blank, e.g., connecting rod blank 1100d. Process 2000 may then continue to step 2314.

In step 2314, the piston pin bore 1110 undergoes a finishing operation, where material is removed, e.g., by machining, from the piston pin bore surface 1110. For example, as described above in regard to FIG. 8C, the contour C that represents the boundary between the piston pin bore surface 1110 and the lubrication recess 1112 may be substantially defined in a finishing operation that removes material from the piston pin bore surface 1110. By contrast, the outer profile P of the lubrication recesses 1112 is generally not affected by any subsequent machining operations, such that the predetermined final configuration of the outer profile P that was substantially defined by forming of the lubrication recess 1112, e.g., in step 2308, remains generally the same. In other words, where the finishing operation is applied primarily to the piston pin bore surface 110, the grainflow G and the border between the lubrication recess 1112 and the front face 1114 of the connecting rod (e.g., as shown in FIGS. 8C and 8D) will remain generally unaffected by the finishing operation. Process 2000 may then continue to step 2350.

In step 2350, a connecting rod is assembled with a piston. For example, as described above in regard to FIG. 8B, the connecting rod 1100 may be assembled to a piston body 1200 with the piston pin 1202.

Accordingly, the connecting rod 1100 is formed using a process 2000 that requires little, if any, additional operations to the lubrication recesses 1112 after forming. That is, the lubrication recesses 1112 can be formed such that a separate machining operation may not be needed to further define or establish the outer profile P of the lubrication recess 1112. Omitting a machining operation to the lubrication recesses 1112 may reduce the complexity in manufacturing of the connecting rod.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method of manufacturing a connecting rod, comprising:

providing a connecting rod blank, where the connecting rod blank includes a crankshaft end and a piston pin end; and forming a crankshaft pin recess in the crankshaft end of the connecting rod blank, a piston pin recess in the piston pin end, and at least one lubrication recess in the piston pin end of the connecting rod blank; and wherein the lubrication recess and the piston pin recess are both formed simultaneously.

2. The method as recited in claim 1, the at least one lubrication recess including an outer profile having a final predetermined configuration, and substantially defining the predetermined final configuration of the outer profile of the at least one lubrication recess by the forming of the piston pin recess step.

3. The method as recited in claim 1, further comprising a generally circular depression within the piston pin recess, the depression defining one of the at least one lubrication recesses and forming at least a portion of the outer profile of the lubrication recess.

4. The method as recited in claim 1, further comprising:
removing a piston pin material flash and a crankpin material flash from the piston pin recess and the crankpin recess, thereby creating a piston pin bore and a crankpin bore.

5. The method as recited in claim 4, wherein removing the piston pin flash and the crankshaft pin flash includes machining the piston pin recess and the crankshaft pin recess.

6. The method as recited in claim 4, further comprising:
coating of at least a portion of an inner surface of the piston pin bore with an anti-friction coating.

7. The method as recited in claim 1, further comprising:
removing a material flash from a perimeter of the connecting rod blank.

8. The method as recited in claim 1, further comprising:
narrowing a cross section of the connecting rod blank at a shaft section, the shaft section connecting the crankshaft end to the piston pin end.

9. The method as recited in claim 1, wherein the piston pin recess, the crankshaft pin recess and the at least one lubrication recess are formed by forging.

10. A method of manufacturing a piston assembly, comprising:
making a connecting rod, including:
providing a connecting rod blank, where the connecting rod blank includes a crankshaft end and a piston pin end, and
forming a crankshaft pin recess in the crankshaft end of the connecting rod blank, a piston pin recess in the piston pin end of the connecting rod blank, and at least one lubrication recess at an inner surface of the piston pin recess, wherein the at least one lubrication recess includes an outer profile having a final predetermined configuration;
wherein the lubrication recess and the piston pin recess are formed simultaneously
assembling the connecting rod to a piston, the connecting rod including the predetermined final configuration of the outer profile; and
substantially defining the predetermined final configuration of the outer profile of the at least one lubrication recess during the forming of the lubrication recess step.

11. The method as recited in claim 10, further comprising:
the step of including a generally circular depression within the piston pin recess, the depression defining at least a portion of the outer profile of the lubrication recess.

12. The method as recited in claim 10, further comprising:
removing a piston pin material flash and a crankpin material flash from the piston pin recess and the crankpin recess to create a piston pin bore and a crankpin bore.

13. The method as recited in claim 12, wherein removing the piston pin flash and the crankshaft pin flash includes machining the piston pin recess and the crankshaft pin recess.

14. The method as recited in claim 12, further comprising:
coating at least a portion of an inner surface of the piston pin bore with an anti-friction coating.

15. The method as recited in claim 10, further comprising:
the step of removing a material flash from a perimeter of the connecting rod blank.

\* \* \* \* \*